(12) United States Patent
Matsumori

(10) Patent No.: US 6,246,998 B1
(45) Date of Patent: Jun. 12, 2001

(54) SYSTEM AND METHOD FOR HOME GROCERY SHOPPING INCLUDING ITEM CATEGORIZATION FOR EFFICIENT DELIVERY AND PICK-UP

(75) Inventor: Kunihiko Matsumori, San Diego, CA (US)

(73) Assignee: Fujitsu Limited, Kanagawa (JP)

( * ) Notice: Subject to any disclaimer, the term of this patent is extended or adjusted under 35 U.S.C. 154(b) by 0 days.

(21) Appl. No.: 09/257,851

(22) Filed: Feb. 25, 1999

(51) Int. Cl.[7] .................................................... G06F 17/60

(52) U.S. Cl. .............................. 705/27; 705/26; 345/349

(58) Field of Search .................................. 705/26, 27, 29, 705/28; 345/349

(56) References Cited

U.S. PATENT DOCUMENTS

| | | | |
|---|---|---|---|
| 5,249,131 | 9/1993 | Kato | 364/478 |
| 5,444,844 | 8/1995 | Inoue et al. | 395/161 |
| 5,451,998 | 9/1995 | Hamrick | 348/13 |
| 5,478,989 | 12/1995 | Shepley | 235/375 |
| 5,493,107 * | 2/1996 | Gupta et al. | 705/20 |
| 5,659,774 | 8/1997 | Saito et al. | 395/117 |
| 5,664,110 | 9/1997 | Green et al. | 705/26 |
| 5,717,598 | 2/1998 | Miyakawa et al. | 364/468.09 |
| 6,026,376 * | 2/2000 | Kenney | 705/27 |
| 6,026,377 * | 2/2000 | Burke | 705/27 |
| 6,035,334 * | 3/2000 | Martin et al. | 709/228 |

FOREIGN PATENT DOCUMENTS

WO 98/21679 * 5/1998 (WO) .............................. G06F/17/60

OTHER PUBLICATIONS

Chandler, S., "The Grocery Cart in your PC: Shoppers–Mainly–Women–Love Peapod's Online Food–Buying Service. But Will it Ever Turn a Profit", Business Week, n. 3441, p. 63, Sep. 1995.*

Cuneo, A. "Peas Fill up the Pod; E–grocers Win with Customers, Lose on Wall Street", Advertising Age, v. 71, p. 52 (reprinted) Apr. 2000.*

Dow Jones Online News "Amazon.com Purchases 35% Stake in Seattle Online Grocery Firm" Dialog Accession No. 05360477, Dow Jones, Inc. 600 words (reprinted), May 1999.*

Billard, D. "Multipurpose Internet Shopping Basket", Proc. Ninth International Workshop on Database and Expert Systems Applications, Los Alamitos: IEEE Comp. Soc. Press, pp. 685–90, Aug. 1998.*

Anonymous, "Dawn of the Online Icebox: New Refrigerators Bring Food Marketers into Consumers' Kitchens", Advertising Age, as downloaded from www.intelligencefactory.com/brand/sight399.asp on Jan. 2001, Mar. 1999.*

* cited by examiner

*Primary Examiner*—Vincent Miller
*Assistant Examiner*—Jeffrey Allen Rossi
(74) *Attorney, Agent, or Firm*—Christie, Parker & Hale, LLP

(57) ABSTRACT

A system for organizing and categorizing purchases made through an Internet based home shopping system is disclosed. Products offered for sale over the Internet are contained in a server's PLU table and are each associated with weights and measures metrics, environmental storage metrics and nutritional content indicia. As items are selected for purchase, and placed in a virtual shopping basket, a user may evaluate the contents of a virtual shopping basket in accordance with any of the physical property, environmental storage, or nutritional content indicia. Goods designated for either pickup or delivery are packaged in accordance with their size and weight criteria and are stored in an appropriate environmental storage facility in accordance with their environmental storage indicia.

21 Claims, 5 Drawing Sheets

SYSTEM AND METHOD FOR HOME GROCERY SHOPPING INCLUDING ITEM CATEGORIZATION FOR EFFICIENT DELIVERY AND PICK-UP

FIELD OF THE INVENTION

The present invention relates to the field of home shopping systems, and in particular to a remote shopping and ordering system which enables items selected for purchase to be categorized in terms of weight, capacity and environmental requirements such that an order may be packaged for more efficient delivery and/or pick-up.

BACKGROUND OF THE INVENTION

Over the past few years systems and methods for facilitating home shopping have become more prevalent among persons with a high degree of constraint on their time. Various home shopping, or remote ordering, systems have been developed which allow customers the ability to order various items of merchandise directly from one or more merchants without the need to travel to a retail facility or spend their time at the store, grocery shopping for example.

Pertinent such types of home shopping, or remote ordering, systems, include television based home shopping networks, where certain merchandise items are placed on display for remote viewing by potential customers. If a customer desires to purchase any of the items being offered, the customer calls the network's telephone number and provides an operator with merchandise ordering and method of payment information. The purchase price is automatically deducted from a customer's credit card, for example, and the merchandise item so ordered is typically delivered through the mails in a few days' time.

While such systems provide a relatively low-price alternative to visiting a retail facility, such home shopping systems are unable to provide a customer with adequate information necessary to track or edit orders and are further unable to provide customers with a more timely method for choosing desired items. Items offered for sale over television based home shopping networks are offered in the sequence devised by the network producers. A customer must often wait for a considerable period of time before an item appears in which they have an interest.

During the same period, home shopping through the Internet has grown increasingly popular as more and more merchants offer goods and services through associated websites. Internet based home shopping systems are considerably more flexible and user-friendly than television based home shopping systems, since all of the items offered for sale are accessible to a potential customer. The customer need only make a selection from a compiled list of items in order to effect purchase. Once a customer selects a particular item, the item is placed in a "virtual shopping basket" which the customer is able to take with them as they traverse the "virtual store". Successive items selected for purchase are placed into the virtual shopping basket until a customer completes their shopping trip. Virtual shopping baskets may be examined at any time and their contents can be edited or deleted at the option of the customer.

When the customer has completed shopping and is ready to purchase their desired items, the virtual shopping basket serves as a user-interpretable list of desired goods and services and includes such identification metrics as an item name, manufacturer, product size and cost. Once the customer decides to effect the purchase transaction, the customer may print-out the contents of the virtual shopping basket in order to obtain a hard copy record of the transaction.

While Internet based home shopping systems allow a home shopping customer a great deal of flexibility, Internet based home shopping systems, particularly Internet based grocery shopping systems, suffer from various disadvantages, specifically with regard to pick-up and delivery options. For example, when a customer visits a grocery store and makes grocery purchases, they are able to evaluate the contents of their shopping cart and make subsequent grocery purchases that will not either overflow the cart or total-up to an unmanageable weight. A customer will adjust the scope of their shopping trip by visually inspecting the shopping cart and making purchase decisions accordingly.

In the case Internet grocery shopping, it is very difficult for a customer to determine the total weight and total volumetric capacity of the goods being placed into a "virtual shopping cart". Since the capacity of a virtual shopping cart is unlimited, a customer may well order an amount of merchandise which exceeds the customer's available space to store it.

This difficulty may be even better understood when one considers that many of the items being ordered have a particular environmental storage requirement, i.e., they must be frozen, refrigerated or be stored at room temperature. A customer must be able to judge whether the goods being ordered can fit into the available refrigerator space, freezer space, and the like.

Accordingly, there is a need for some means to provide Internet based home shopping customers with such adequate weights and measures information such that they may compile and/or edit their virtual shopping basket accordingly. In addition to providing such weights and measures information, an Internet based home shopping system should be able to categorize purchased items according to their environmental storage requirements such that a customer is able to prepare sufficient space for their receipt. By using this type of information, a grocery store can appropriately package and store ordered items in an appropriate environment while awaiting the customer's arrival for pick-up. If the grocery retailer also provides delivery service, the categorized items can be stored in an appropriate section of a delivery vehicle, i.e., freezer compartment, refrigerated section, and the like.

SUMMARY OF THE INVENTION

An Internet based home shopping system is able to characterize purchased items according to weights and measures, environmental storage and nutritional content indicia such that a customer is able to make effective purchase decisions and is able to prepare an appropriate space and environment for receiving the goods. The Internet based home grocery shopping system includes a home personal computer system configured for Internet access and communicating with the system server at the desired retail facility. The store server is configured to host an Internet access application program and includes an Internet communication interface, a control processor and a mass storage device. A master PLU database is stored in the mass storage device and contains data representing item identification, item price and item weights and measures metrics with each metric associated to a particular item of merchandise. The PLU database further includes an environmental storage metric which identifies the environment suitable for storing the corresponding item of merchandise.

In one aspect of the invention, a consumer accesses the store server over an Internet connection and selects various items of merchandise for purchase from a menu or menus provided for such purpose. As items are selected for purchase, an application program opens and maintains a transaction log file including means for summing merchandise item information metrics, including the item identification, price, and weights and measures metrics. The application program further includes means for displaying the summed metrics on a display screen of the home personal computer system, thereby allowing a consumer to visually inspect at least the size and weight characteristics of an electronic order.

In a further aspect of the invention, the application program includes means for categorizing an electronic order according to an environmental storage metric, such that individual items comprising the order are each segregated into common environmental storage groupings. The items which have been segregated into common environmental storage groupings are subsequently stored in an environment designated by an environmental storage code, such as a freezer code, a refrigerator code, and a room temperature storage code. In this manner, a grocery store is able to appropriately package and store ordered items in an appropriate environment while awaiting the customer's arrival for pick up, or during delivery of the items to a customer's home.

In yet an additional aspect of the invention, items comprising an electronic order are categorized into a virtual shopping basket which is displayed to the customer over the display monitor of the home personal computer system. The virtual shopping basket allows the customer to have a visual indication of the volumetric capacity of the order, as well as allowing the customer a visual indication of the number of items allocated to the various environmental storage areas. Advantageously, such a system provides a method by which the unlimited capacity of a virtual shopping cart may be monitored in order to avoid the problems of over purchasing.

BRIEF DESCRIPTION OF THE DRAWINGS

These and other features, aspects and advantages of the present invention will be more fully understood when considered with respect to the following detailed description, appended claims, and accompanying drawings, wherein:

FIG. 1b is a semi-schematic block diagram of the server portion of the shopping system of FIG. 1a;

FIG. 2b is an optional, user parameter controlled field containing additional merchandise item information, forming a portion of the PLU table of FIG. 2a;

DETAILED DESCRIPTION OF THE INVENTION

In general, the present invention is directed to a computerized system for home shopping through the Internet, which permits a customer to browse through a virtual grocery store, select items for purchase, and allocate those items to a virtual shopping cart prior to effecting a transaction. Purchased items are allocated to various categories including their environmental storage requirements and virtual shopping basket is configured to display items on a shopper's screen such that a shopper may immediately perceive the amount of items allocated to each category. In addition, various weights and measures metrics are assigned to each of the various items stocked by a store. While making a virtual shopping trip, a shopper is able to judge the amount of their purchases according to the total weight of the goods disposed within the virtual shopping basket and the volumetric capacity of the goods.

Additional metrics are also assigned to the items stocked by the store and include personalized nutritional information which is provided to a shopper in a simplified form.

Figure 1A:
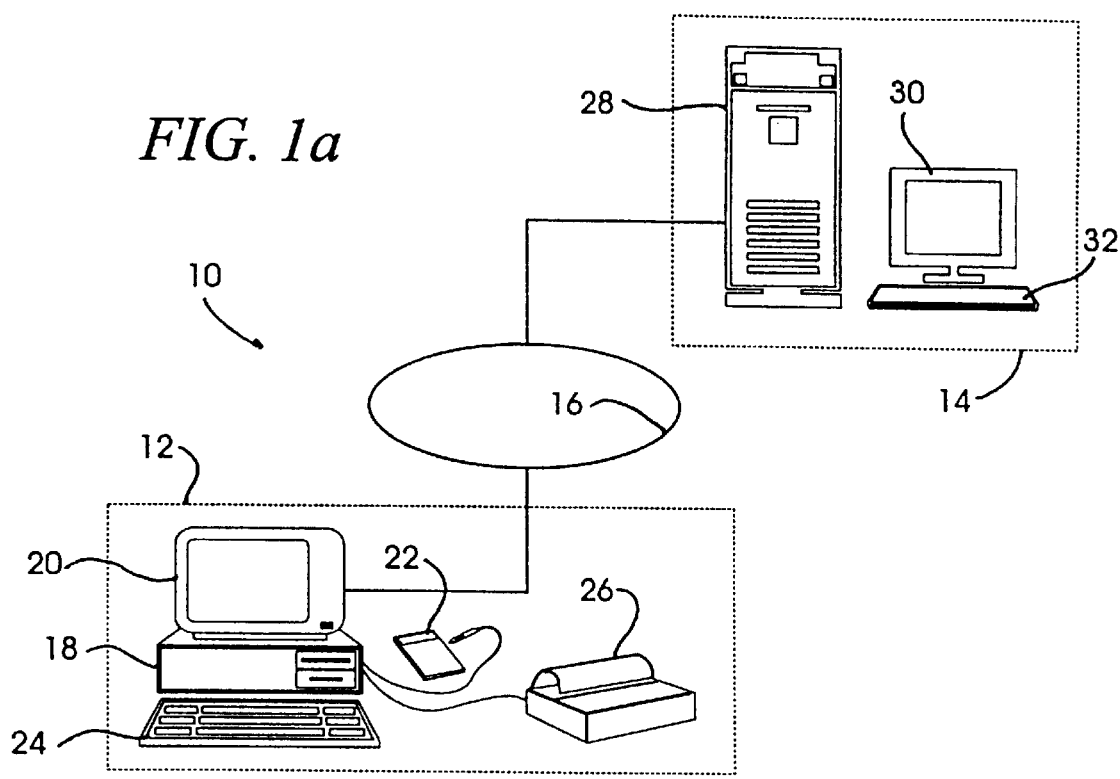
FIG. 1a is a semi-schematic representation of an Internet based home grocery shopping system in accordance with the present invention.

Referring now to FIG. 1a, there is depicted in simplified, semi-schematic form, a generalized diagram of an Internet home shopping system 10 according to the present invention. The Internet based home shopping system 10 is suitably configured into two major portions, a portion configured for use in the home 12 and a portion disposed in a retail facility such as a grocery store 14. Communication between and amongst the home portion 12 and the store portion 14 is made over a wide-area-network, such as the Internet 16.

In order to communicate with a grocery store, the home portion 12 of the system suitably comprises a computer 18 having a monitor 20 suitable for both text and graphic display purposes. Additionally, a pointing device 22 such as a mouse, track ball, stylus, and the like, provides input to the computer system and defines one of the means by which a user might navigate through an application program and make selections from various menus described on the monitor screen 20. In addition to the pointing device 22, a keyboard 24 is also provided which allows a user to input information in a more flexible form and/or edit certain information selected by the pointing device. An optional printer 26 is also disclosed and provides means for generating hard copy receipts, and the like.

Connectivity between the home portion 12 and the network 16 may be effected in various forms without violating the scope and spirit of the present invention. In particular, network connectivity may be made by a telephone line/modem combination as is well known in the art, a dedicated ISDM line or a cable modem-type set-top-box which provides for Internet connectivity through certain forms of cable television services. In each of the aforementioned cases, the computer 18 of the home portion 12 will need to be provided with a suitable I/O card, such as a modem, 10Base-T card, ISDM card, and the like, in order to effect an appropriate interface with the network connection.

Inherent in the system is the need for a potential consumer to have access to the Internet in order to communicate with a virtual grocery store. Accordingly, it is desirable that the potential consumer contract with an Internet service provider and put a suitable Internet browser program on their computer system 18.

At the retail store portion 14 of the Internet connection, a virtual grocery store is hosted on a computer system operating as a network server. In a preferred embodiment, the network server suitably comprises a computer 28, depicted in the embodiment of FIG. 1a with an attached monitor 30 and a keyboard 32 for inputting data into the system. Typically, the computer 28, with its associated peripheral devices will be physically located at an accessible location in a retail facility such as a grocery store or market. In addition to the monitor 30 and keyboard 32 shown, the store portion 14 may also include additional peripheral devices such as magnetic card readers, bar code readers, keypad and touch screen entry devices, and other well known means for accommodating data I/O.

Figure 1B:
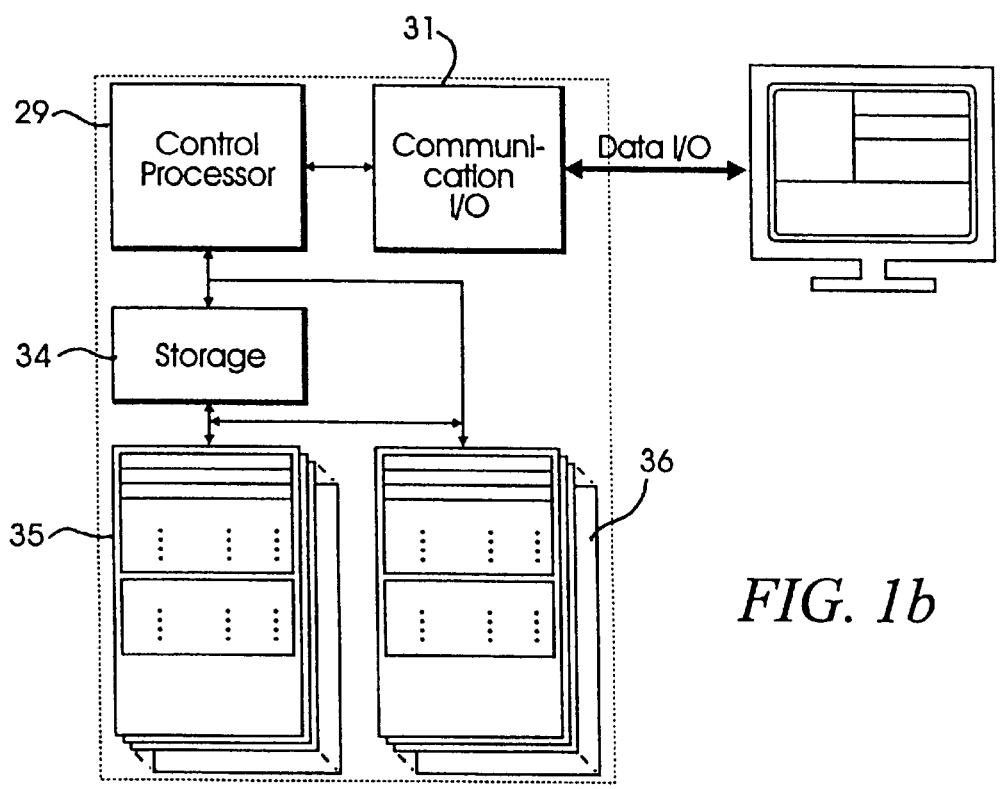

According to practice of principles of the invention, and as depicted in the block diagram of FIG. 1b, the in-store computer 28 includes processor means 29 operating under application software program control and is configured to host the virtual grocery store's Internet web pages, host and maintain the store's inventory control and host and maintain a multiplicity of consumer selection and purchase transactions. The processor correlates certain personal data input by a consumer through communication I/O means 31, with a virtual shopping basket containing the various products which that particular consumer wishes to purchase.

Merchandise item information is stored in tabular form in a database termed a PLU (Price Look-Up). The PLU database is stored in a large capacity mass storage device 34, such as a hard disk drive, or might alternatively be stored in a large capacity RAM or other alternative mass storage medium. Regardless of its configuration, the mass storage device 34 hosts a number of purpose-built databases and files useful for implementation of the system of the present invention. Particular such databases and files include the Price Look-Up file (PLU) 35, a multiplicity of transaction log files 36, and optionally, a customer database which includes demographic, personal preference, personal profile and other information specific to each particular customer. In cases where the mass storage unit 34 is configured to include a customer database, it should be noted that each particular customer's data record is identified by and associated with a unique customer identification number, termed customer ID. As will be described in greater detail below, each customer's ID number identifies that customer and enables the store computer system 28 to identify a virtual shopping basket and its associated transaction log file with that particular customer as well as allowing access to that particular customer's data record from the network server's mass storage unit 34.

Figure 2A:
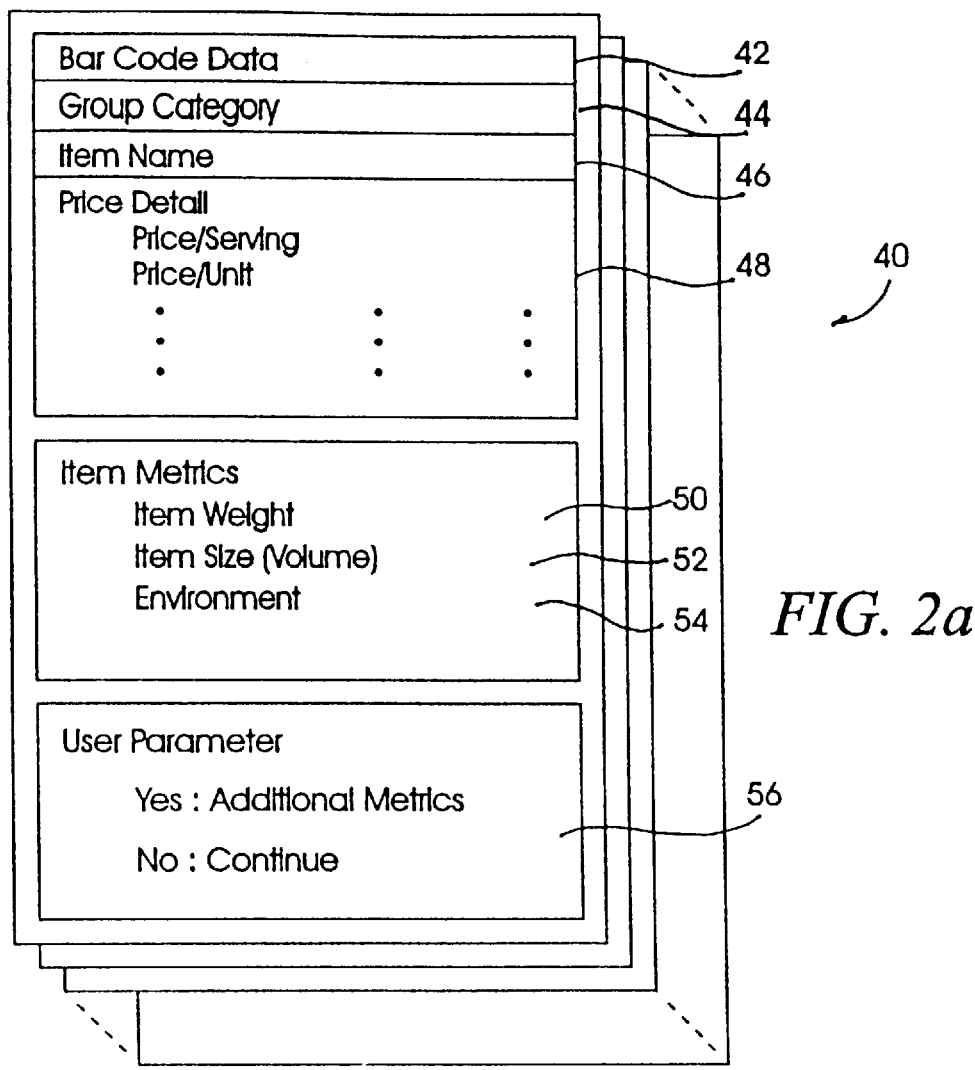
FIG. 2a is a semi-schematic representation of an exemplary PLU table highlighting an item listing.

As illustrated in FIG. 2a, an exemplary PLU table 40 suitably comprises a set of merchandise specific information, which might be arranged in a variety of ways, but is most advantageously configured as sequential entries, with each entry specific to a particular piece of merchandise. An entry for a particular piece of merchandise would include the store's item identifier, such as a Stock Keeping Unit (SKU) number, a Universal Product Code (UPC) number, or the like, which is identified in the embodiment of FIG. 2a as an item's Bar Code Data 42, an item's Bar Code Data is identified to a particular product's Universal Product Code (UPC) by a suitable conversion routine.

A particular merchandise item entry further includes an item category field 44, typically implemented as a text string which identifies a particular food group category to which the item might belong; meats, vegetables, dairy products, fruit, and the like. A product name or item information field 46 is also implemented as a text string and identifies the brand or trade name of the product and might also include a generic description of the product, i.e., KLEENEX®, facial tissues.

In addition to the bar code data, food group category and product name, each merchandise item entry further includes a price field 48 which might be further subdivided into an item price portion which contains the item price, i.e., $1.99, and a price comparison portion which contains an item's price-per-unit, i.e., 2.0¢ per piece. Weights and measures fields 50 and 52, respectively, are associated to each merchandise item and define an item's weight as well as an item's volumetric capacity (an item's size). An environmental grouping field 54 is also implemented as a text string and defines the environment in which that particular merchandise item needs to be stored, i.e., in the freezer, refrigerator or at room temperature.

Thus, in accordance with the present invention, a PLU file 40 contains all the necessary information upon which to base a purchasing decision with respect to a particular piece or item of merchandise, all organized in accordance with each particular item of merchandise's bar code data.

It should be noted that the PLU table 40 of the exemplary embodiment of FIG. 2a, may be further expanded to include additional, optional information, such as generalized nutritional data, or the like.

Figure 2B:
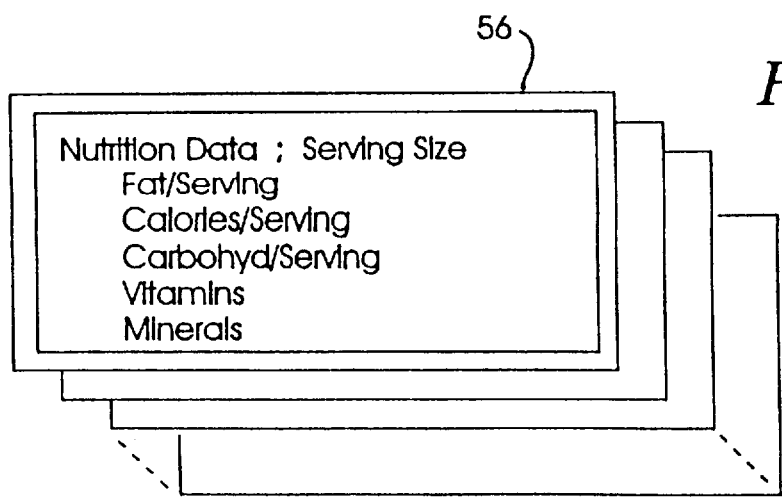

As depicted in FIG. 2b, a user parameter controlled field 56, forming a portion of the PLU table of FIG. 2a, defines an electronic doorway to an additional set of merchandise item information data associated with each particular item of merchandise stocked by the store. This additional set of merchandise item information may be invoked by having the user pass a switch parameter to the application program hosted by the store computer system indicating that the user wishes to view these additional data fields and that the computer system should process them accordingly. As shown in FIG. 2b, this additional information suitably comprises a number of entries related to a particular item's nutritional content. The entries would include certain nutritional information such as an item's recommended serving size, the serving size's fat content, protein content, carbohydrate content, and might even include a listing of the vitamin and mineral content of a grocery item. The additional information depicted in FIG. 2b is able to provide Internet based home shoppers with the ability to obtain individualized nutritional information regarding desired food items, thereby allowing them to make more informed food choices. For example, a shopper is able to easily determine which of four or five different soup products best meets his or her nutritional goals, without having to physically visit a grocery store in order to read and understand often confusing nutrition labels. As will be described in greater detail below, at the end of a virtual shopping trip, the nutritional content of the total food purchase may be tabulated along with the virtual shopping basket's weight, volumetric capacity and environmental grouping.

In a manner to be described in greater detail below, the contents of the virtual store's inventory, as defined by the PLU entries, are accessible to a potential customer and are displayed on that customer's computer screen in the form of web pages. The customer is able to select various items for purchase and to place those items into a "virtual shopping basket". Initially, a customer identifies themselves to a virtual store by inputting their unique customer ID. All that is required is that each customer's ID be unique and that each customer ID be immediately recognizable by the store network server processing circuitry. Once a customer ID is received, the network server processing circuitry invokes a transaction subroutine which runs on the store server and which loads a transaction log file from the store database and assigns it to the customer whose customer ID was read.

Figure 3:
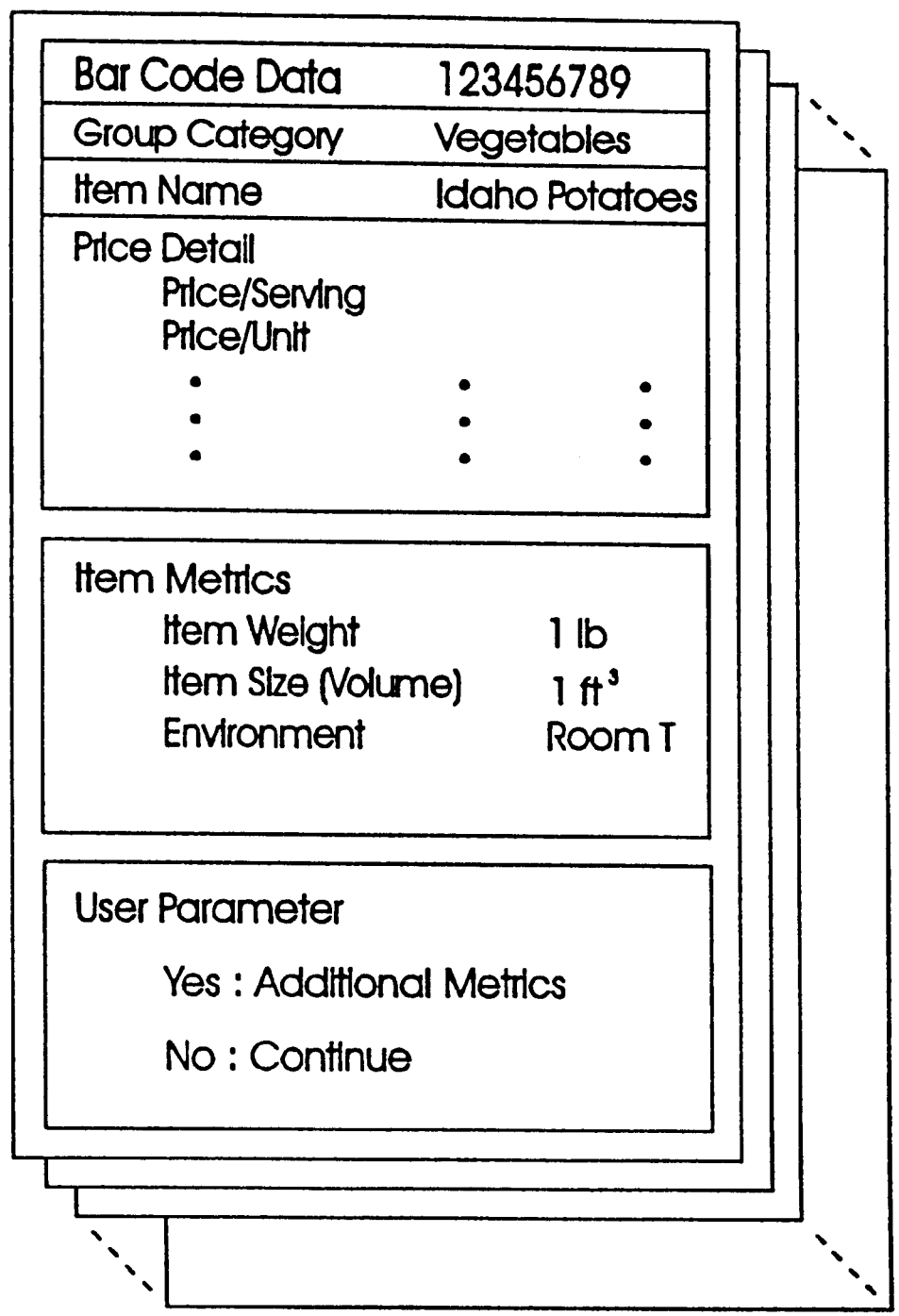
FIG. 3 is a semi-schematic representation of a PLU table item listing highlighting the weights, measures, nutritional and environmental metrics of a particular item.

An exemplary PLU table entry for a particular merchandise item is depicted in semi-schematic form in FIG. 3. The entry suitably comprises merchandise item price data, weights, measures, nutritional and environmental metrics for the particular piece of merchandise, i.e., Idaho Potatoes. Each transaction entry is pertinent to a merchandise item and the transaction entries are continuously summed into a running-total transaction summary, much like a printed transaction summary on a printed receipt. In addition to an item listing, the PLU table entry suitably comprises a price field associated to the item, a weights and measures field for containing an item's weight and capacity information, an environmental grouping field and a user parameter invocable extension field into which an item's nutritional information might be placed. Customers are able to enter items to be purchased into their transaction log file by selecting items as they appear on their computer terminal screen. Items selected may be increased, decreased or deleted at the desire of a consumer, with the transaction log file updating the entries accordingly.

Figure 4:
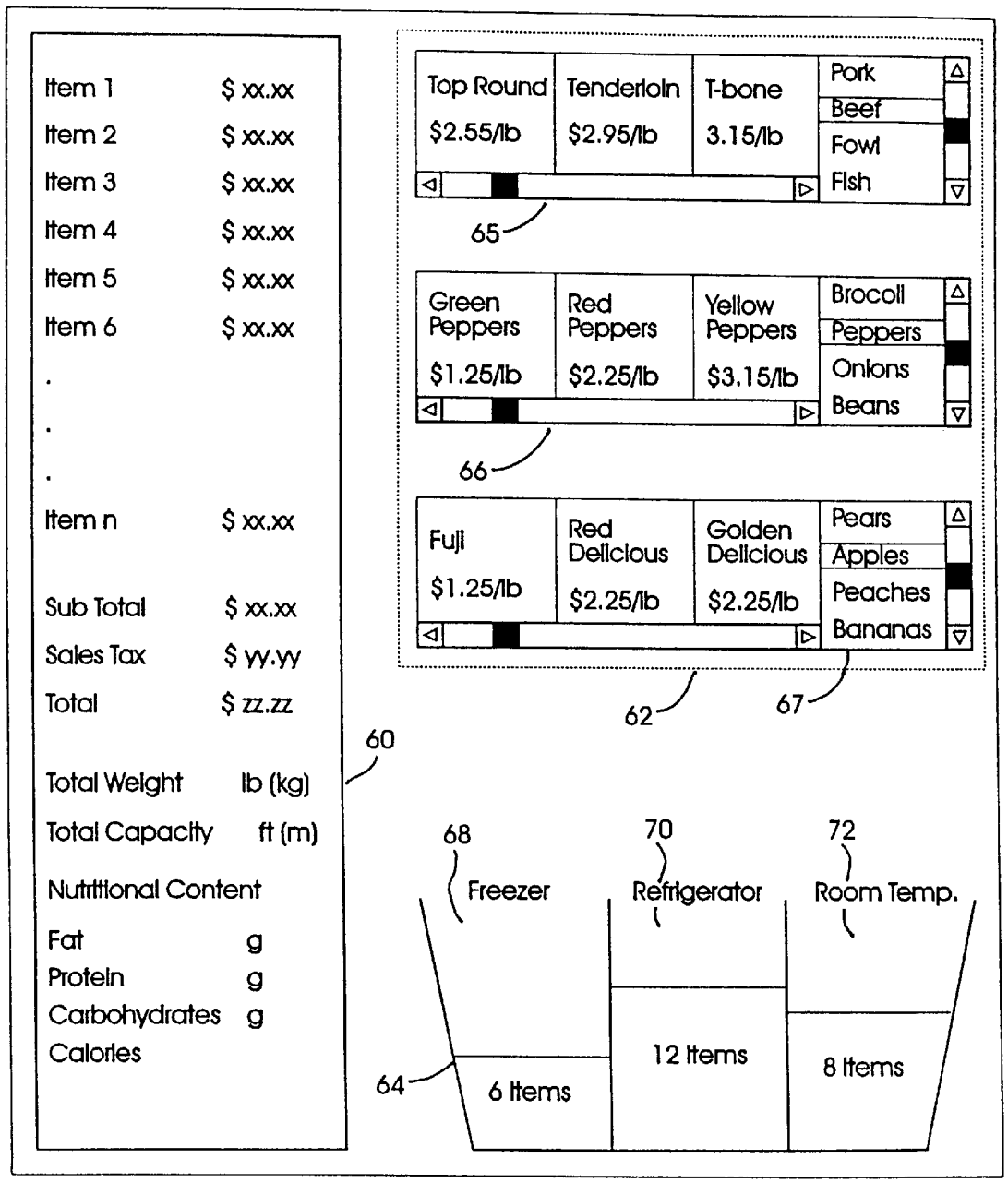
FIG. 4 is a semi-schematic representation of an exemplary screen image of a home grocery shopping system, showing an exemplary transaction log file, according to the invention.
Figure 5:
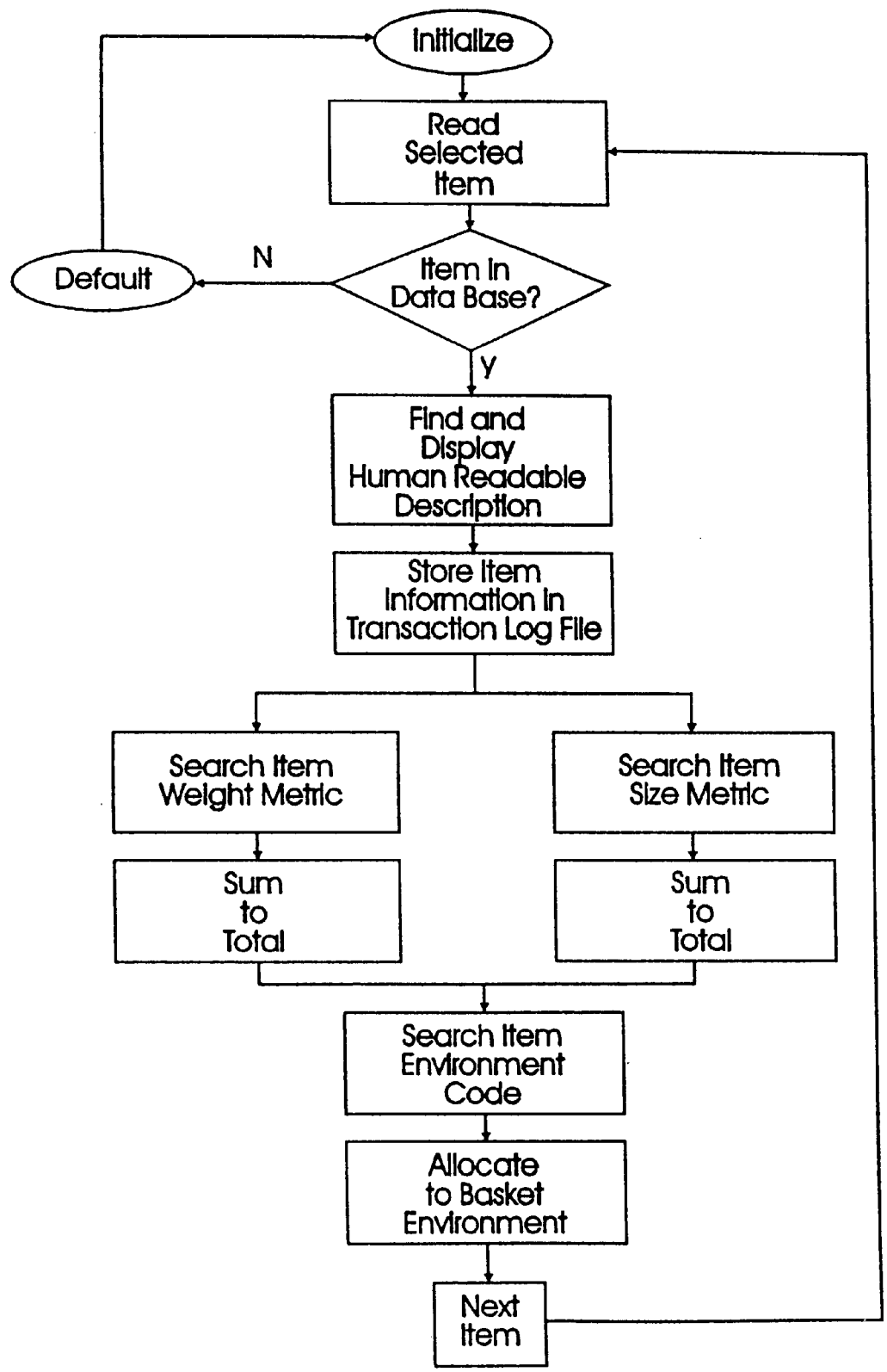
FIG. 5 is a flow chart representation of a home grocery shopping system according to the invention.

An exemplary screen image for an Internet based home shopping system, in its transaction mode, is illustrated in FIG. 4. As can be seen from the illustration of FIG. 4, a typical screen image might be subdivided into three pertinent portions; a transaction portion 60 which displays the transaction log file in a user observable format, an inventory selection portion 62 and a graphical representation of a customer's "virtual shopping basket" 64. In the transaction log file portion 60, a customer is able to visually inspect the transaction log file data for each merchandise item selected for purchase and is also able to view a running price total for all of the items purchased. During a particular transaction, a customer is able to cancel a purchase entry by either selecting that entry with a pointing device, or by scrolling a screen cursor up or down through the entries until the particular item is selected. Once an item is selected, an item is deleted by striking the computer delete key in conventional fashion.

The transaction portion 60 further includes a running-total summary of the total weight and volumetric capacity of the goods selected for purchase, as well as a running total summary of the nutritional content of the chosen food items, if the optional nutritional content information is selected for display by the user. In this manner, a consumer is able to immediately discern the size, scope and weight of their grocery order, as well as make reasoned decisions as to the nutritional content of the chosen products.

Food item selection is made from menus which appear in the inventory section 62 and which allow a consumer to search through a virtual grocery store's inventory by food group category, as well as by individual item. For example, the inventory section 62 might include a separate menu area for listing meat products 65, such as pork, beef, fowl or fish. If a consumer chooses to view beef products, for example, the individual items comprising the virtual grocery store's beef offerings are displayed in an additional menu or alternatively, a scrolling window. These individual items would be identified by the product name information contained in the store's PLU file and might also display price and other information associated with that item in order to enable a consumer to make a reasoned decision regarding purchase.

Likewise, additional menus might be provided for vegetables 66, fruits 67, and the like with each item's food group category forming one choice level for the consumer which, when selected, causes the system to display all of the specific products contained within that food group category. Alternatively, the inventory section 62 might be organized in the form of a set of cascading windows defined by a decision tree. The first window might merely list the food group categories available for selection by a consumer. Once a food group category is selected, the choice window would expand to display an intermediate, generic listing of the foods available within that category, i.e., the choice of vegetables on the food group category window might expand the window into a listing of vegetable types. Choosing a particular vegetable type, i.e., peppers, would again expand the window to a listing of the specific pepper products offered for sale by the virtual store, i.e., green peppers, red peppers, yellow peppers, chile peppers, and the like. Selecting a specific merchandise item with a pointing device causes that item and its associated PLU data to be entered into that customer's transaction log file and to be displayed in the transaction summary portion 60 of the screen. The running-total transaction summary, weights and measures metric and nutritional content fields are recalculated and redisplayed accordingly.

The pictorial representation of a customer's virtual shopping basket 64 gives the customer a visual representation of the number and amount of items selected for purchase of items to be stored under particular, pre-selected environmental conditions. Accordingly, the virtual shopping basket 64 is subdivided into three regions in the embodiment of FIG. 4, with each region representing a particular environmental storage requirement. The first region 68 represents freezer environment and depicts the number of items selected for purchase that need to be maintained in a frozen condition. The second region 70 is the refrigerator region and gives a representation of the number of items selected for purchase that need to be maintained in a refrigerated condition. Similarly, the third region 72 depicts the number of items selected for purchase that do not need to be stored in any particular environment and may be maintained at room temperature.

In accordance with principles of the invention the type of information depicted in either the freezer 68, refrigerator 70 or room temperature 72 regions of the virtual shopping basket 64 may be altered at the desire of the user by, for example right-clicking a mouse while the cursor is placed within the selected region. Right-clicking the mouse might open a window which allow the user to select the content display of each of the environmental regions of the basket. Specifically, each of the environmental regions might be configured to display the number of items selected which are associated to that environmental group, the weight of the items selected that are associated to that environmental group or the volumetric capacity of the items selected that are associated with that environmental group. Thus, a virtual shopper can not only see how many items need to be refrigerated but also the amount of space required to be allocated within their refrigerator to store those selected items. Thus, the merchandise item information contained in any particular customer's transaction log file can be processed and displayed to that customer in any one of a variety of forms, depending on that customer's information needs.

An additional advantage of these categorization features according to the invention are the assistance that they are able to give a store in providing pick-up and delivery service. As a consumer completes their order, stock clerks are able to pull the items from the store or warehouse shelves and are able to group the items according to their environmental storage requirements. A customer's frozen foods order can then be packaged and maintained in a freezer section until either the customer arrives to pick-up the order or until the store delivery service is ready to deliver the order to the customer. Likewise, food items requiring refrigeration may be stored in a refrigeration section while the room temperature items may be packaged and stored without any environmental constraints. These features are also particularly useful if a delivery service vehicle is provided with freezer, refrigerator and room temperature storage compartments, such that the various portions of a customer's order may be maintained in an appropriate environment during delivery.

In summary, the system and method of the present invention comprises a store network server which includes merchandise item information maintained in a PLU table in a form suitable for display on the store's Internet web pages. When a customer is ready to begin shopping, they identify themselves to the store server by a unique customer identification code which causes the store server's processor to open a transaction log file and associate that log file with that particular customer. Merchandise items are displayed to the customer through an application software program suitable for access over the Internet and items are selected by a home shopper merely by pointing and clicking a conventional pointing device. As items are selected for purchase, various pieces of information are transferred from the PLU table to that customer's transaction log file and are displayed to the customer in a form and format suitable for the customer's information needs. Pertinent types of additional information available for display to the customer include individual item and running-total weights and measures data including the volumetric capacity of the order. Additional information includes individual item and running-total nutritional content data in a form suitable to allow a consumer to meet his or her nutritional goals without the need to visit the store to obtain nutritional information on the selected grocery items. Items are further categorized according to their environmental storage requirements and, as they are selected by a consumer, are allocated to an appropriate environmental storage section in the consumer's virtual shopping basket.

Thus, there has been brought to the art of electronic home shopping systems, a data maintenance and shopping display system that is able to provide a meaningful set of information to a consumer over and above mere item and price listings. The types of information available to the consumer allow the consumer to not only make reasoned choices regarding which products to buy but also to judge the size, weight and scope of their purchases during a virtual shopping trip.

While the invention has been described with respect to particular illustrated embodiments, those skilled in the art and technology to which the invention pertains will have no difficulty devising variations which in no way depart from the scope and spirit of the present invention. For example, while the illustrated embodiments have been described in connection with a store network server system, coupled to the Internet, it will be appreciated that a distributed set of network servers could be employed to like effect and utility without departing from the present invention. In addition, the communication link or links employed between the store server system and various home shoppers need not necessarily be associated with the worldwide web. Indeed, a dedicated network might be employed with equal facility.

Additionally, the manner in which information is stored on the network server and the manner in which that information is displayed to any particular customer need not conform to the embodiments described above. Rather, merchandise item information may be stored in any one of a variety of forms and made accessible to a customer in a variety of ways without departing from the scope and spirit of the invention. All that is required is that each merchandise item have associated with it a set of weights and measures metrics and a set of environmental storage requirement metrics that are made accessible to a consumer so that the consumer may have full and complete information regarding their total purchase.

Accordingly, the present invention is not limited to the specific embodiments described above, but rather is defined by the scope of the appended claims.

What is claimed is:

1. An Internet based home grocery shopping system including a personal computer system configured for Internet access, the system comprising:

a store server configured to host an Internet access application program and including an Internet communication interface and a control processor;

a mass storage device coupled to the store server;

a master PLU database stored in the mass storage unit, the PLU database including data representing item identification, price and weights and measures metrics, each said metric associated with an item of merchandise, the PLU database further including an environmental storage metric identifying an environment suitable for storing said item of merchandise; and means for summing the merchandise item information metrics, including the weights and measures metrics, the means for summing further including means for displaying the summed metrics on a display screen of a personal computer system, thereby allowing a consumer to visually inspect a size and weight characteristic of an electronic order.

2. The system according to claim 1, further including means for categorizing an electronic order according to an environmental storage metric, such that individual items comprising the order are each segregated into common environmental storage groupings.

3. The system according to claim 2, wherein the order items segregated into common environmental storage groupings are stored in an environment designated by an environmental storage code.

4. The system according to claim 3, wherein the environmental storage codes are selected from the group consisting of a freezer code, a refrigerator code, and a room temperature storage code.

5. The system according to claim 4, wherein the means for summing the merchandise item information metrics comprises an application program.

6. The system according to claim 5, further comprising a virtual shopping basket, including an electronic storage area into which items selected for purchase are stored.

7. The system according to claim 6, wherein the PLU database further includes a size metric assigned to individual items of merchandise stocked by the store.

8. The system according to claim 7, further comprising means for organizing the items contained in the virtual shopping basket in accordance with their weight, size and environmental requirements indicia, such that the contents of the virtual shopping basket may be arranged and viewed by a consumer in accordance with a weight, size or environmental requirements indicia selection.

9. The system according to claim 8, the master PLU database further including nutritional content indicia associated to each merchandise item, the system further comprising means for organizing the contents of the virtual shopping basket in accordance with the nutritional content subject to a consumer's selection of a nutritional content indicia.

10. In an Internet based home shopping system, wherein merchandise orders are transmitted to a store server via a personal computer coupled to an Internet network, a system for organizing selected items into categories based on user selected indicia, the system comprising:

a PLU table including merchandise item information, hosted on the store server, the PLU table including weight, size and environmental requirements indica, each assigned to individual items of merchandise stocked by the store;

a virtual shopping basket, comprising an electronic storage area, into which items selected for purchase are stored; and means for organizing the items contained in the virtual shopping basket in accordance with their weight, size and environmental requirements indicia, such that contents of the virtual shopping basket may be arranged and viewed by a consumer in accordance with a weight, size or environmental requirements indicia selection.

11. The system according to claim 10, the PLU table further including nutritional content indicia associated to each merchandise item, the system further comprising means for organizing the contents of the virtual shopping basket in accordance with nutritional content subject to a consumer's selection of a nutritional content indicia.

12. The system according to claim 11, further including means for organizing the contents of the virtual shopping basket in accordance with each item's environmental requirements, subject to a consumer's selection of the environmental requirements indicia.

13. The system according to claim 12, further comprising means for indicating the total weight of items contained in virtual shopping basket.

14. The system according to claim 13, further comprising means for indicating the total volumetric size of the items contained in the virtual shopping basket.

15. The system according to claim 14, wherein the means for organizing the items contained in the virtual shopping basket in accordance with their weight, size, environmental requirements and nutritional content comprises an application program executing on the personal computer and communicating with the store server over the Internet network.

16. The system according to claim 15, the personal computer including a display screen for displaying the virtual shopping basket, the display screen further displaying at least a transaction log file record containing at least a total price, total weight, and a total capacity of the items contained in the virtual shopping basket.

17. In an Internet based home shopping system, wherein merchandise orders are transmitted to a store server via a personal computer coupled to an Internet network, a method for organizing selected items into categories based on user selected indicia, the method comprising:

assigning a weight, a size and an environmental requirements indicia to individual items of merchandise stocked by the store;

forming said merchandise item indicia information into a PLU table, hosted on the store server;

providing a virtual shopping basket, including an electronic storage area;

electronically selecting items for purchase;

adding each item selected for purchase to the contents of the virtual shopping basket; and organizing the items contained in the virtual shopping basket in accordance with their weight, size and environmental requirements indicia, such that contents of the virtual shopping basket may be arranged and viewed by a consumer in accordance with a weight, size or environmental requirements indicia selection.

18. The method according to claim 17, the PLU table further including nutritional content indicia associated to each merchandise item, the method further comprising the step of organizing the contents of the virtual shopping basket in accordance with the nutritional content subject to a consumer's selection of a nutritional content indicia.

19. The method according to claim 18, further comprising the step of segregating the contents of the virtual shopping basket into common environmental storage groupings, subject to a consumer's selection of an environmental requirements indicia.

20. The method according to claim 19, further comprising the step of storing the items, segregated into common environmental storage groupings, in an environment designated by an environmental storage code.

21. The method according to claim 20, wherein the environmental storage codes are selected from the group consisting of a freezer code, a refrigerator code, and a room temperature storage code.

\* \* \* \* \*